Aug. 1, 1939. G. M. GRAHAM ET AL 2,167,803
HEADLIGHT TESTING APPARATUS
Filed June 28, 1937 3 Sheets-Sheet 1
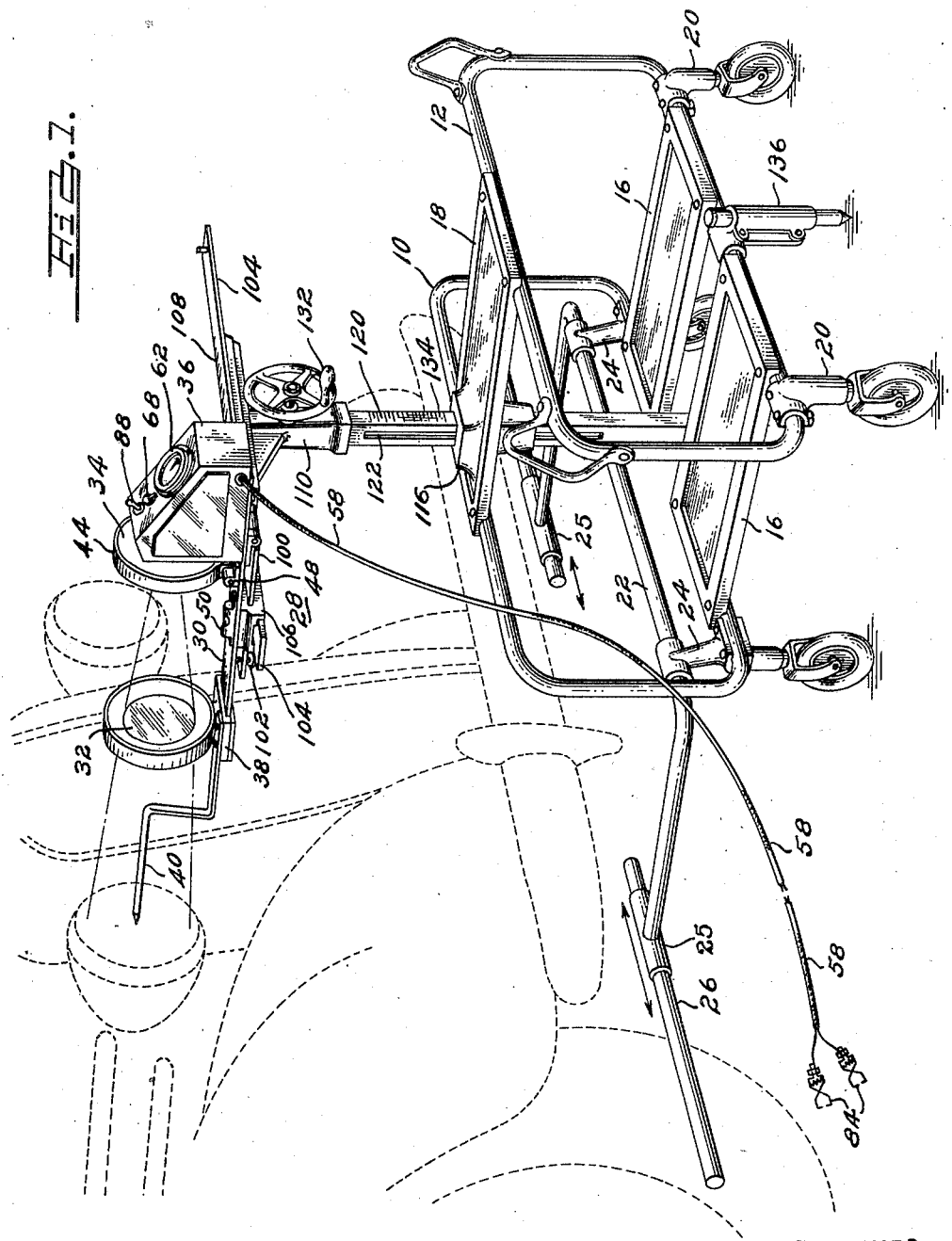
INVENTORS
George M. Graham
Charles W. MacMillan
BY
Parker & Burton
ATTORNEYS

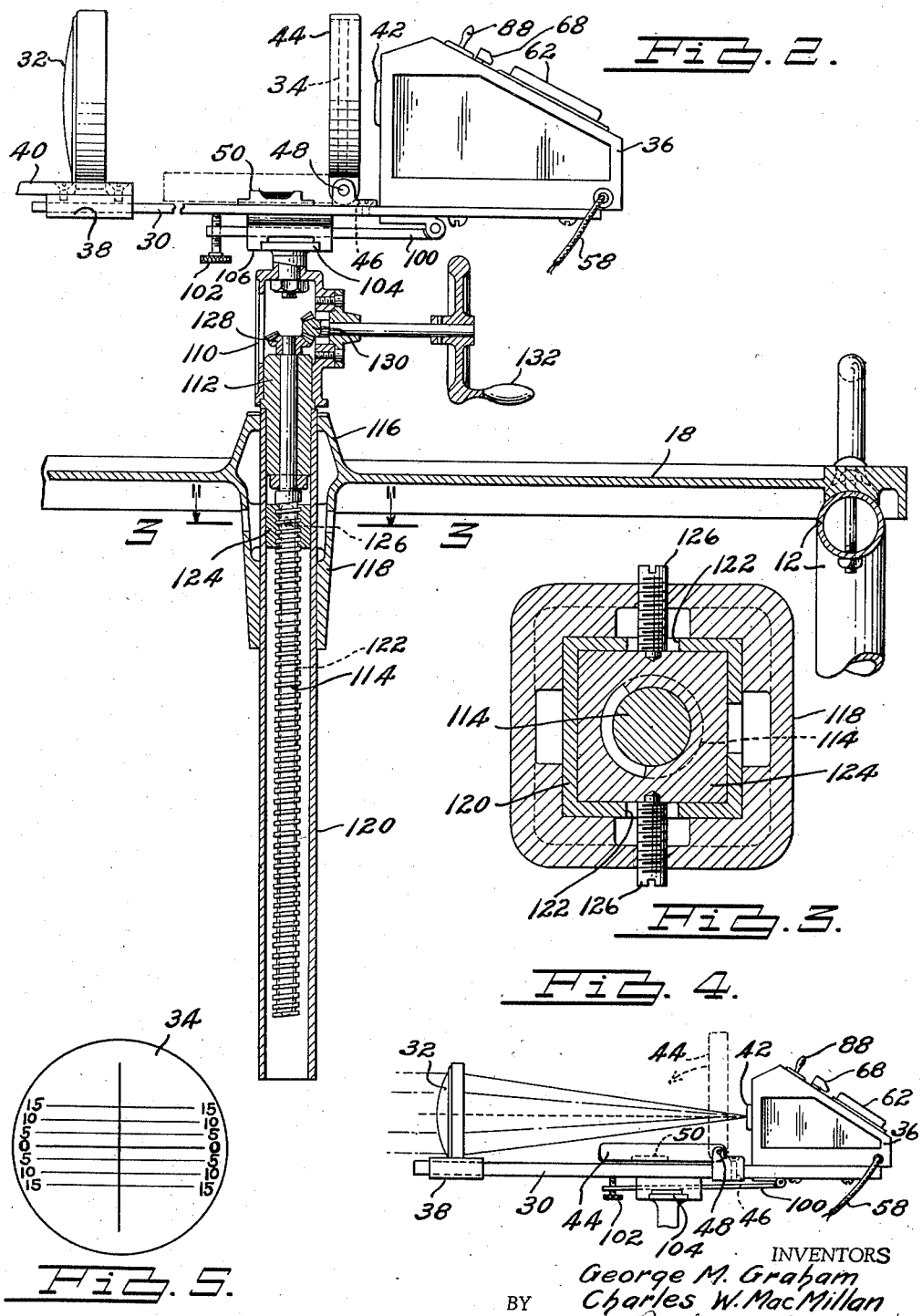

Aug. 1, 1939.  G. M. GRAHAM ET AL  2,167,803
HEADLIGHT TESTING APPARATUS
Filed June 28, 1937  3 Sheets-Sheet 3
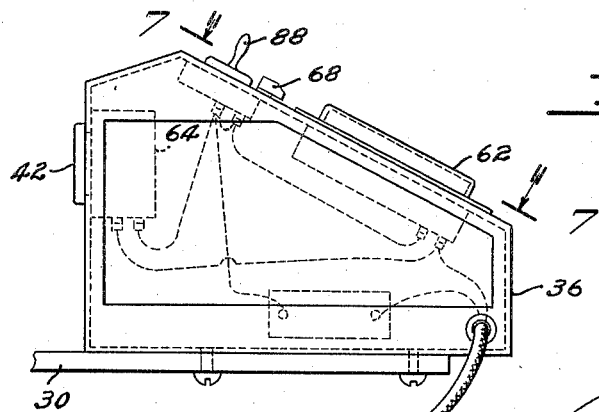
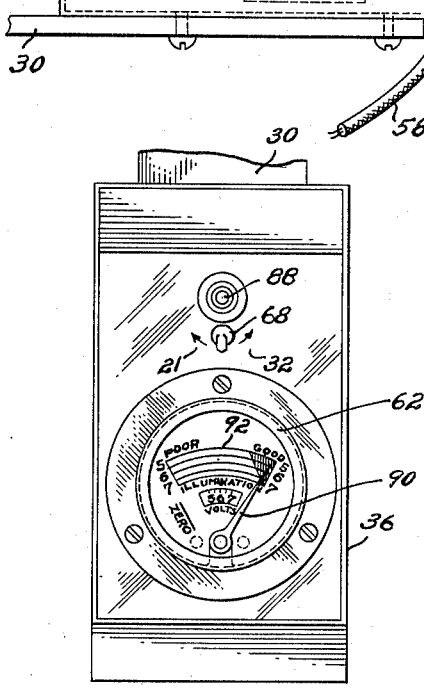
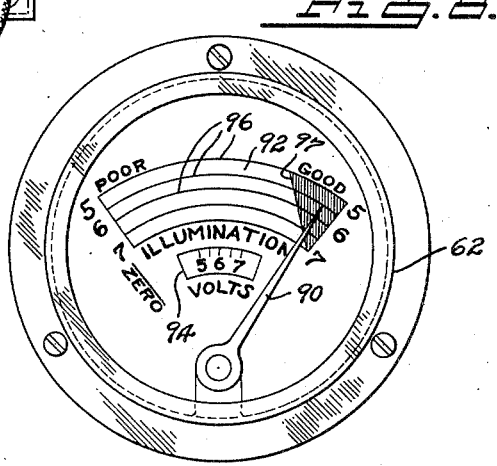
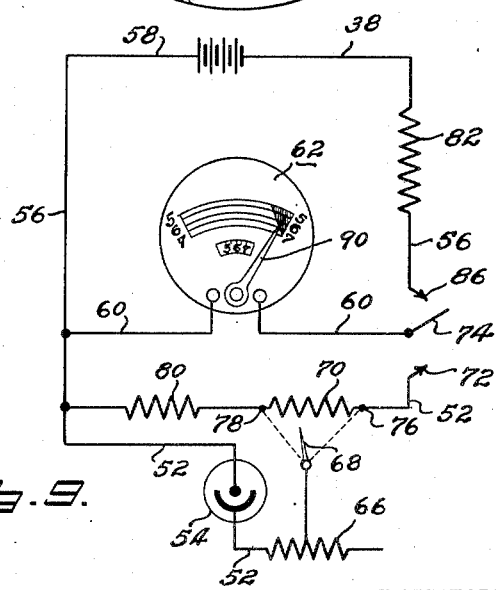
INVENTORS
George M. Graham
Charles W. MacMillan
BY Parker & Burton
ATTORNEYS Patented Aug. 1, 1939

2,167,803

UNITED STATES PATENT OFFICE 2,167,803

HEADLIGHT TESTING APPARATUS

George M. Graham and Charles W. MacMillan, Detroit, Mich., assignors to Hinckley-Myers Company, Jackson, Mich., a corporation of Michigan Application June 28, 1937, Serial No. 150,726

4 Claims. (Cl. 88—14)

This invention relates to improvements in apparatus for testing the headlight illumination of motor vehicles.

An important object of this invention is to provide a novel headlight testing apparatus for accurately measuring the various factors of headlight illumination. The various elements of the apparatus are combined in a novel, compact relationship, and form a complete, self-contained, portable unit.

More particularly, the invention comprehends a testing head composed of a condensing lens, a headlight alignment screen, and an electric instrument for measuring the intensity of headlight illumination. These elements are mounted in a row upon a single supporting member for joint movement together. The lens condenses the beam of light directed therethrough from a headlight and the beam thus condensed is arranged to fall upon either the electric testing instrument or upon the headlight alignment screen. One of these last mentioned elements is movably supported so that in one position it intercepts the condensed beam and in another position it permits the condensed beam to pass on uninterruptedly to the other element. In the embodiment of the invention illustrated herein, this movable element is the headlight alignment screen. Novel means is employed for hinging this screen to the testing head so that when it is not needed it may be swung or folded out of the path of light condensed by the lens.

Various other objects, advantages and meritorious features of the invention will become more fully apparent from the following specification, appended claims and accompanying drawings wherein:

Figure 1 is a perspective view of the improved headlight testing apparatus showing the manner in which it is brought into operating position in front of an automobile, Figure 2 is a detail view, partially in cross-section, showing the testing head and the manner of elevating the same, Figure 3 is a cross-sectional view along line 3—3 in Figure 2, Figure 4 is a detail view illustrating the operation of the testing head, Figure 5 is a front view of the testing screen, Figure 6 is a side view of the light sensitive testing instrument, showing diagrammatically the various circuits contained theerin, Figure 7 is a top view of the light sensitive electric instrument shown in Figure 4, Figure 8 is an enlarged detail view of the dial for measuring the percentage efficiency of a headlight beam, Figure 9 is a diagrammatical view of the electric circuits in the testing instrument shown in Figs. 6 and 7.

Referring in detail to the drawings, and particularly to the Figure 1, a portable standard is provided for supporting a testing head before a headlight of an automobile. This standard is composed primarily of tubular elements bent so as to form a frame work upon which the testing head is supported. Two of such tubular elements 10 and 12 form spaced vertical rectangular frames as shown in Figure 1. Plates or trays 16 connect the bottom sections of the rectangular frames, 10 and a tray 18 connects the top sections of the rectangular frames. The rectangular frames are supported from the floor at their opposite corners by any suitable form of casters 20, as shown in Figure 1.

A tubular bar 22 is pivotally connected to the front rectangular frame 10 by means of brackets 24. Bar 22 is bent laterally at its opposite ends and carries a sleeve 25 at each extremity in each of which a tire contact squaring bar 26 is slidably supported. In use the tire contact bars 26 extend in the position shown in Figure 1. In non-use they may be swung upwardly against the rectangular frame 10 by virtue of the pivotal connecting means 24.

A testing head generally indicated at 28 in Fig. 1 is mounted for both horizontal and vertical adjustment relative to the standard in a manner which will be more fully described hereinafter. The testing head comprises a supporting bar 30 carrying thereon a plano-convex lens 32, a headlight alignment screen 34, and a unitary housing structure 36 in which is contained electrical mechanism for measuring the various factors of headlight illumination. As shown in detail in Figure 2, lens 32 is supported in upright position upon the bar 30 by a bracket 38, which is removably secured to the bar in any suitable manner. Projecting from the bracket 38 is a pointer element 40, which as shown in Figure 1 is adapted to center the testing head opposite the headlight lamp which is to be tested.

The unitary housing structure 36 is provided with an aperture 42 in the front face thereof which is mounted in alignment with the axis of the lens 32. This aperture is disposed at a distance from the lens substantially equal to the focal length of the lens. Accordingly, when a headlight beam is directed through the lens 32, it will be condensed by the lens and directed into the aperture 42.

The headlight alignment screen 34 is carried within a frame 44 which overhangs the opposite surfaces of this screen. The screen 34 is positioned adjacent to the aperture 42 and when in upright position as shown in Figures 1 and 2, will intercept the beam of light condensed by the lens 32. A bracket 46 removably secured to the top of the bar 30 has suitable hinge means 48 pivotally connecting the screen frame 44 to the top of the bar 30. The hinge connection 46 permits the screen to be swung out of the path of the condensed beam of light and thereby allows the condensed beam to enter the aperture 42.

In the embodiment of the invention illustrated herein, the screen may be swung or folded downwardly upon the top of the bar 30, as shown by the dotted lines in Figure 2.

A suitable bubble level indicator 50 is secured to the top of the bar 30. This indicator may be so positioned on the bar that when the screen is folded to the inopertive position, the overhanging screen frame 44 forms a housing about the bubble level indicator.

The light measuring mechanism housed within the structure 36 is diagrammatically illustrated in Figure 9. It comprises, in general, a light sensitive electric circuit 52 including a light sensitive element 54 which is disposed across the aperture 42, a voltmeter circuit 56 having flexible lead-in wires 58 extending from the instrument housing, and a circuit 60 including an electrical meter 62 which is adapted to be electrically connected across either circuit 52 or the voltmeter circuit 56. In Figure 6 element 54 is enclosed within a compartment 64 overlying the aperture 42. It is arranged to receive the light rays passing through the aperture and produce a current in proportion thereto.

The circuit 52 of the light sensitive element 54 also includes a variable calibration resistance 66, which is adjusted after the apparatus is made and tested and is fixed in this adjusted position before commercial use. A switch 68 serves to cut in and cut out a resistance 70 in that portion of the circuit 52 leading to the terminal 72 of a switch device 74. When switch 68 is swung to the terminal 76 on the right-hand side of resistance 70, the resistance 70 is cut out and the circuit is in a condition for testing headlights of a relatively low standard of candle power, such as 21 candle power. When the switch 68 is swung to the terminal 78 on the left-hand side of resistance 70, the resistance is now included in the circuit leading to the switch terminal 72, and circuit 52 is now in condition for measuring headlights of a relatively higher standard of candle power, such as 32 standard candle power. Resistance 80 is provided for balancing the circuit.

The high resistance 82 in circuit 56 enables the electric meter 62 to function as a voltmeter for measuring the voltages normally used in the headlight circuits of motor vehicles. Voltmeter circuit 56 is fully connected into the meter circuit 60 by way of the terminal 86 and the switch 74 when the latter contacts terminal 86. The terminal clamps 84 employed on the extremities of the leads 58 provide detachable connecting means for electrically connecting circuit 56 across any accessible points in the headlight circuit.

The electric meter circuit 60 is alternately connected across either circuit 52 or 56 by movement of the switch 74. In Figure 4 the switch has a handle 88 which projects from the top of the housing 36 for manual actuation. The electric meter 62 is exposed to view through the top of the housing 36 as shown in Figure 4, and includes a pointer 90 and a graduated surface over which the pointer is adapted to swing.

The graduated surface over which the pointer swings has two separate scales, one for indicating the quality or efficiency of the headlight beam, and the other for indicating the voltage of the cuit of the headlight under test. Readings are taken from the former scale when the switch contacts terminal 72, and from the latter scale when the switch 74 contacts terminal 86. The view in Figure 8 shows in detail the two scales above referred to. Illumination scale 92 indicates the quality or efficiency of headlight illumination, while scale 94 indicates various voltages customarily employed in headlight circuits. Pointer 90 therefore has the dual function of indicating on either one or the other scale the particular reading desired.

Illumination scale 92 is of relatively large width, and superimposed upon this scale are a plurality of reference lines 96 extending longitudinally of the scale in spaced parallel relationship to one another, and curved to follow the path of the pointer. Each of these lines corresponds to a certain voltage normally used in headlight circuits, and as shown in Figure 8 these lines are numbered "5", "6", and "7" corresponding to the voltage graduations "5", "6", and "7" on the voltmeter scale 94.

Adjacent the right end of the scale 92 is a region which may be colored differently to contrast it from the rest of the scale. This region is of irregular size and the term "Good" appearing above this region refers to a satisfactory quality of headlight illumination. The left end of the scale has the term "Poor" appearing thereabove, and intermediate the end regions of this scale is a region which indicates progressively better headlight illumination from left to right. The left margin 97 of the region referred to as "Good" extends angularly across the parallel lines 96 as shown. This margin bears a special relationship to the sensitivity of the element 54, and cooperates with the pointer 90 for indicating the best quality of headlight illumination for each voltage normally used in headlight circuits. In other words, the left margin of this region visually compensates for the differences in the voltages of the headlight circuits which are tested by the apparatus. Accordingly, when the voltage of a given headlight circuit is known, the pointer reading on scale 92 will indicate the exact quality of headlight illumination for that particular headlight voltage. The proper reading of the graduations on the dial will therefore compensate for the differences in the voltages of the headlight circuits in motor vehicles.

As previously explained, the testing head 28 is supported as a unit on the supporting bar 30. This bar in turn is supported by improved mechanism for horizontal and vertical adjustment. Referring to Figures 1 and 2, a supporting bar 100 extends below and parallel to bar 30, and is hinged at its rear end to bar 30. A knurled screw 102 is provided at the front end of bar 100 for swinging the bar 30 about its hinged connection to bar 100. A third supporting bar or member 104 extends on a level below and at right angles to bars 30 and 100. A bracket 106 is slidably secured to the top of bar 104 and is fixed to intermediate supporting bar 100 for joint movement horizontally along the supporting bar 104. This horizontal adjustment allows the testing head to be moved from in front of one headlight lamp of a motor vehicle to a position in front of the other headlight lamp. Graduations 108 measuring from the center of the bar 104 may be provided for indicating the distance of such adjustment. It is obvious that rotation of the knurled screw 102 will vary the inclination of the testing head, and that the bubble level 50 may be used to determine when the elements on the testing head are in proper horizontal alignment.

Novel elevating means is provided for raising and lowering the testing head. This means comprises a vertical tubular housing 110, which in this instance is square shaped, connected at its upper end to the bar 104. The lower end of this housing overlaps upon a journal member 112 and is fixed thereto. A vertical screw shaft 114 is rotatably supported in the journal member, and is shouldered at the opposite ends of the journal member to prevent relative longitudinal movement of the shaft with respect to the journal member. Tray 18 is formed with projecting buttressed portions 116 and 118 on opposite sides thereof, in which tubular member or sleeve 120 is slidably mounted. This tubular member is square shaped as indicated in Figure 1, and encloses in spaced relationship the screw shaft 114. The upper end of this squared tubular member overlaps upon the journal member 112 and is fixed thereto. It is therefore seen, that the housing 110, the tubular member 120, and the screw shaft 114 are all associated together for joint vertical movement.

The square shaped tubular member 120 is provided with longitudinal slots 122 on opposite sides thereof. These slots, as shown in Figure 1, extend from one side of the tray 18 to the other side thereof. Internally threaded nut 124 is mounted inside of the tubular member 120 within the buttressed portion 118. It is restrained against rotation and longitudinal movement by means of suitable elements projecting through the slots 122 fixedly securing the nut to the buttressed portion 118. These elements may be screws 126 which thread in the buttressed portion 118 and project into suitable recesses provided in the nut. Screw shaft 114 is threaded to the nut as shown in Figure 2. Means for rotating the screw shaft 114 is provided in the housing 110. This means comprises bevel gears 128 and 130 operatively associated with a handle or crank arm 132 projecting rearwardly over the tray 18. It is obvious that upon rotation of this handle screw shaft 114 will be rotated and moved longitudinally up or down relative to the nut 124, and raise or lower the testing head in proportion to the amount of turning movement of the handle 132.

The testing screen 34 as illustrated in Fig. 5 is provided with a vertical reference line and a plurality of horizontal reference lines indicating different heights on the vertical reference line. This screen is intended to represent conditions of headlight illumination at a given distance in front of the motor vehicle, such as 25 feet. In operation, the testing head is adjusted until the zero line is on a level with the headlight bulb. The lighter horizontal lines above and below the zero line indicate the position of the headlight beam, at 25 feet distance, in inches above or below the height of the headlight bulb. The reference numerals at the ends of the lighter horizontal lines indicate the distances in inches above and below the zero line at the distance of 25 feet in front of the headlights. The provision of the testing head including a condensing lens reduces this distance to a small convenient amount for testing purposes.

The tubular supporting member 120 for the testing head carries a scale 134 on the rear side (see Fig. 1). This scale bears a special relation to the zero line on the testing screen and measures in inches and subdivisions thereof the height of the zero line above the floor or ground. The measurements of this height may be read from the top of the buttressed portion 116 of tray 18.

To test the illumination of the headlights of a motor vehicle, the apparatus is wheeled in front of a motor vehicle as shown in Figure 1. Before the testing operations are commenced, it is advisable to have the car in unloaded condition on a level floor or runway, and to have all tires properly inflated. The front tires should be in straight ahead position. The tire contact bars 26 are lowered to horizontal position and placed against the front tires. This will square the apparatus with respect to the motor vehicle and align the testing head instrumentalities in parallel relation with the longitudinal median line of the vehicle. A locking device 136 may now be depressed for engagement with the floor to lock the apparatus in squared position against movement in front of the motor vehicle.

To measure the efficiency of a headlight beam, the headlight lens is removed and may be placed on any one of the trays 16 or 18 during the test. The testing head 28 is now slid horizontally until pointer element 40 appears opposite the bulb of one of the headlights. The testing head may be adjusted vertically by rotating hand wheel 132 until the pointer element 40 is directly in line with the bulb in the headlight. The knurled screw 102 may be adjusted, if necessary, until the spirit level indicates that the testing head is in level condition. The alignment screen is folded down to the position shown in Figure 4, to allow the condensed headlight beam to enter the aperture 42. The clamping elements 84 on leads 58 are attached across a headlight circuit at any accessible point, such as by connecting one of the clamps to the electric motor starting terminal, and the other clamp to a ground. The handle 88 of the switch 74 is now turned to proper position for measuring the voltage of the headlight circuit. The headlight lamp should be "on" during the reading of the voltage scale 94. Switch 74 is now turned to its opposite position to disconnect the headlight circuit from the meter circuit, and to connect the latter across the circuit of the light sensitive element 54. Rheostat switch or knob 68 is turned to the candle power marking on the top surface of the housing 36, corresponding to the candle power of the headlight bulb under test. This either cuts-in or cuts-out the resistance 70. The condensed beam of light on element 54 will generate an electric current proportionate to the intensity of the light received thereon. This will cause pointer 90 to swing and indicate the quality of headlight illumination on the scale 92.

In order to indicate a satisfactory condition of headlight illumination, pointer 90 should fall within the region marked "Good" on the voltage line 96 corresponding to the voltage of the headlight circuit as previously determined. That is to say, if the headlight of the circuit is found to have 6½ volts impressed thereon, the pointer 90 should go at least as far to the right on scale 92, as the intersection of the curved voltage line 96 corresponding to 6½ volts with the inclined left margin 97 of the region marked "Good". The dial in Figure 8 indicates a satisfactory headlight illumination for a headlight circuit having 6½ volts, but indicates an unsatisfactory headlight illumination for a headlight circuit of 7 volts.

To determine if the headlight is in proper alignment with respect to the motor vehicle, the headlight lens is replaced upon the headlight, and the bright or upper beam of light is used. The screen 34 is swung about its hinged connection to the upright position shown in Figure 2, where it intercepts the beam of light condensed by the lens 32. This screen has formed thereon horizontal and vertical reference lines which indicate the condition of the headlight beam at a given distance in front of the vehicle. The position of the image formed by the lens on the screen will indicate the true character of the beam. Usually for best driving purposes the image should appear slightly below the zero line and a little to the right of the vertical line for the left headlight and a little to the left of the vertical for the right headlight. The formation of the image will depend upon the style of the headlight lens and this should also be taken into consideration in the test. Generally, the customary headlight lens will form on the screen an elliptical shaped image having its longer axis substantially horizontal. Typical images which the condensed beam of light may form on the screen are shown in Figures 3 to 7 in the copending application for patent, Serial No. 82,419, of George M. Graham.

What we claim is:

1. An apparatus for testing the headlights of motor vehicles comprising, in combination, a supporting bar adapted to be positioned in front of a headlight of a motor vehicle in longitudinal relationship to a beam of light issuing therefrom, a unitary housing structure supported on said bar and enclosing light sensitive headlight testing mechanism, said housing having an aperture in one face thereof opening longitudinally parallel to the bar, a light condensing lens supported on said bar in spaced relationship to the apertured face of said housing, said lens and the aperture of the housing disposed in alignment so that when the supporting bar is positioned in longitudinal relationship in front of a headlight of a motor vehicle the beam of light issuing from the latter is condensed by the lens and directed through the aperture of the housing for light testing purposes, a headlight alignment testing screen, and hinge means pivotally connecting the screen to the top of said bar about an axis transverse thereto for movement from an upright position between the lens and the apertured face of said housing but adjacent to the latter where it is capable of intercepting the light condensed by said lens to a folded position upon the top of the bar and thus allow an uninterrupted condensed beam of light to enter the aperture in the housing.

2. An apparatus for testing the headlights of a motor vehicle comprising, in combination, a narrow relatively long horizontal supporting bar adapted to be positioned in front of a motor vehicle headlight in parallel relationship to the longitudinal median line of the vehicle, a unitary housing structure enclosing a light sensitive headlight testing instrument, means removably supporting said housing upon the top side of said bar, a light condensing lens, means removably supporting the lens upon the top side of said bar at a distance in front of said housing substantially equal to the focal length of the lens, said housing having an aperture in the front face thereof opening in substantial alignment with the axis of the lens and thereby adapted to receive the beams of light condensed by said lens when the bar is brought in proper position in front of a headlight of a vehicle, a headlight alignment testing screen, a bracket for said screen removably secured to said bar adjacent to the front face of said housing, and hinge means carried by said bracket on the top side of the bar pivotally connecting said screen to the bracket for movement from a vertical position before the front face of said housing where it intercepts the light beam condensed by said lens to a position substantially flat against the top side of the supporting bar where it is removed from the path of the condensed beam of light.

3. An apparatus for testing the headlights of a motor vehicle comprising, in combination, a narrow relatively long horizontal supporting bar adapted to be positioned in front of a vehicular headlight in parallel relationship to the longitudinal median line of the vehicle, a light condensing lens supported upon the top side of the supporting bar and adapted when the bar is positioned in longitudinal relationship in front of a vehicle headlight to condense the beam issuing therefrom, a unitary housing supported upon the top side of said bar in spaced relationship to the lens and having the side thereof adjacent to the lens provided with an aperture in alignment with the axis of the lens, light sensitive electrical mechanism in said housing having a light sensitive element disposed adjacent to the aperture to receive the condensed light beam entering therethrough, an electric meter electrically associated with said mechanism for registering the intensity of the headlight beam condensed on said element, and a screen having reference marks supported upon the top side of the bar between the lens and the housing, and means hinging said screen to said bar for swinging movement from an upright position on the top of the bar to a folded position against the top of the bar, said screen in upright position adapted to intercept a condensed beam of light passing from the lens to the light sensitive electric element in the housing.

4. An apparatus for testing the headlights of a motor vehicle comprising, in combination, a horizontal supporting bar, a light condensing lens supported upon the top side of said bar in upright position, a light sensitive element supported upon the top side of said bar in alignment with the axis of said lens and at a distance therefrom substantially equal to its focal length, a meter electrically associated with said element for indicating the intensity of the headlight beam condensed on the element, a reference screen, a hinge swingably securing the screen to the top side of said bar between said lens and said element but adjacent to the latter for swinging movement from an upright position where it intercepts the rays of light condensed by said lens to an inoperative position lying closely adjacent to and substantially parallel to the top of said bar, a frame around said screen projecting from the face of the screen which lies adjacent to the top of the bar when the latter is in inoperative position, a bubble leveling device secured to the top of said bar, said bubble level device so positioned on said bar that it is housed within the frame of the screen when the latter is swung to inoperative position adjacent and parallel to the top of the bar.

GEORGE M. GRAHAM.
CHARLES W. MacMILLAN.